United States Patent Office 3,752,673
Patented Aug. 14, 1973

3,752,673
SILVER HALIDE EMULSION CONTAINING A MEROCYANINE DYE
Henri Depoorter, Mortsel, and Theofiel Hubert Ghys, Kontich, Belgium, assignors to Gevaert-AGFA N.V., Mortsel, Belgium
No Drawing. Filed Jan. 20, 1971, Ser. No. 108,162
Claims priority, application Great Britain, Jan. 20, 1970, 2,770/70
Int. Cl. G03c 1/22
U.S. Cl. 96—140                                6 Claims

ABSTRACT OF THE DISCLOSURE

Novel merocyanine dyes are provided which correspond to the general formula:

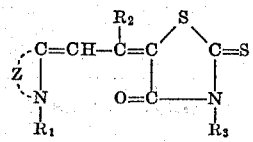

wherein:

Z stands for the atoms necessary to close a pyrroline, a tetrazole, a thiazoline or a selenazoline nucleus, $R_1$ stands for an aliphatic group or an aryl group substituted by sulphato, phosphono, sulphamoyl or sulphonylcarbamoyl, $R_2$ stands for hydrogen, an aliphatic group or an aryl group, and $R_3$ stands for an aliphatic group or an aryl group carrying at least one sulpho group or carboxyl group, the acidic groups being in the free acid form or the salt form. These merocyanine dyes can be used for the spectral sensitization of light-sensitive silver halide emulsions. They do not enhance the fog and leave practically no residual stain after processing and therefore are particularly suitable for the sensitization of Lippmann-emulsions, emulsions of the "lith"-type and emulsions used in stabilisation processing.

---

The present invention relates to novel merocyanine dyes, to the preparation thereof, to their use as spectral sensitizers for light-sensitive elements, more particularly silver halide emulsion layers, and to light-sensitive elements sensitized therewith.

In accordance with the present invention novel merocyanine dyes are provided which correspond to the following general formula:

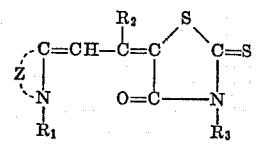

Z stands for the atoms necessary to close a pyrroline nucleus, a tetrazole nucleus, a thiazoline nucleus or a selenazoline nucleus, $R_1$ stands for an aliphatic group including a saturated aliphatic group, an unsaturated aliphatic group and a cycloaliphatic group, or an aryl group which groups are substituted by sulphato, phosphono, sulphamoyl or sulphonylcarbamoyl and may carry further substituents; examples of these groups are sulphatoethyl, sulphatopropyl and sulphatobutyl, phosphonopropyl and the group—AWNHVB as, e.g., described in United Kingdom patent specification 904,332 wherein each of W and V represents carbonyl, sulphonyl or a single bond, at least one of W and V being sulphonyl, A represents an alkylene group, e.g. a $C_1$-$C_4$ alkylene group, and B represents hydrogen, alkyl including substituted alkyl, amino including substituted amino, e.g. acylamino, diethylamino or dimethylamino, with the proviso however that B does not represent hydrogen when V stands for carbonyl or sulphonyl, the group AWNHVB being exemplified by N-(methylsulphonyl)-carbamoylmethyl, γ-(acetylsulphamoyl)-propyl and δ - (acetylsulphamoyl)-butyl, $R_2$ stands for hydrogen, an aliphatic group, including a saturated aliphatic group, an unsaturated aliphatic group and a cycloaliphatic group such as alkyl, allyl, aralkyl and cycloalkyl, which groups may carry substituents, or an aryl group including a substituted aryl group, and $R_3$ stands for an aliphatic group including a saturated aliphatic group, an unsaturated aliphatic group and a cycloaliphatic group or an aryl group which groups are substituted by at least one sulpho or carboxyl group, and may carry further substituents; examples of these groups are carboxymethyl, carboxyethyl, 1,2-dicarboxyethyl, sulphoethyl, carboxyphenyl and sulphophenyl.

The acidic groups may be present in the free acid form or the salt form.

Representative examples of merocyanine dyes corresponding to the above general formula are given in the following table.

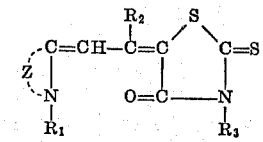

| Dye | Z (N⟩) | $R_1$ | $R_2$ | $R_3$ |
|---|---|---|---|---|
| 1 | Pyrroline | $(CH_2)_3\cdot O\cdot SO_3Na$ | H | $CH_2\cdot COOH$ |
| 2 | id | id | H | $CH_2\cdot CH_2\cdot COOH$ |
| 3 | id | id | H | $CH-CH_2-COONa$ <br> $\mid$ <br> $COONa$ |
| 4 | id | id | H | $(CH_2)_2SO_3Na$ |
| 5 | id | id | H | ⟨phenyl⟩-COOH |

TABLE—Continued

| Dye | ⟨N⟩Z | R₁ | R | R |
|---|---|---|---|---|
| 6 | id | $(CH_2)_4-SO_2NH_2$ | H | $(CH_2)_2SO_3Na$ |
| 7 | Thiazoline | $(CH_2)_3\cdot O\cdot SO_3Na$ | H | $CH_2-COOH$ |
| 8 | id | id | H | $CH_2-CH_2-COOH$ |
| 9 | id | id | H | $CH-CH_2-COONa$ / $COONa$ |
| 10 | id | $(CH_2)_4-SO_2-NH-CO-CH_3$ | H | $CH_2CH_2COOH$ |
| 11 | Phenyltetrazole | $CH_2-CO-NH-SO_2-CH_3$ | H | id. |
| 12 | id | $(CH_2)_3-O-SO_3H\cdot N(C_2H_5)_3$ | H | id. |
| 13 | id | $(CH_2)_4-SO_2-NH_2$ | H | $CH_2CH_2SO_3Na$ |
| 14 | id | $(CH_2)_4-SO_2-NH-CO-CH_3$ | H | id. |

In the following table are listed spectral data obtained from measurements of solutions of the dyes in the solvent given.

| Dye | Solvent | Abs. max. (nm.) | $\epsilon\cdot 10^{-4}$ |
|---|---|---|---|
| 1 | Methanol/water (1:1) | 486 | 7.4 |
| 2 | Methanol | 488 | 7.7 |
| 3 | Methanol/water (1:1) | 480 | 5.0 |
| 4 | Methanol | 485 | 7.5 |
| 5 | do | 480 | 7.3 |
| 7 | do | 482 | 5.5 |
| 8 | do | 485 | 6.5 |
| 9 | Methanol/water (1:1) | 491 | 7.7 |

The merocyanine dyes according to the present invention can be prepared by methods well known to those skilled in the art, e.g. by condensing (a) A cyclammonium quaternary salt corresponding to the formula:

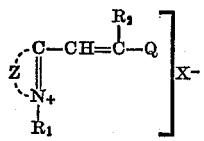

wherein:

Z, $R_1$ and $R_2$ have the same significance as above,

Q stands for a β-arylamino group preferably an acylated β-arylamino group, e.g. β-acetanilido or an alkoxy group, and $X^-$ stands for an anion, but is not present when $R_1$ contains an anionic group, with a rhodanine compound of the formula:

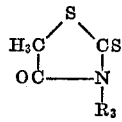

wherein $R_3$ has the same significance as above;

(b) A cycloammonium quaternary salt corresponding to the formula:

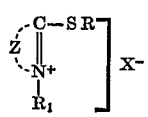

wherein:

Z, $R_1$ and $X^-$ have the same significance as above, and

R is a lower alkyl, with a rhodanine compound of the formula:

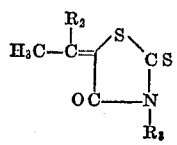

wherein:

$R_2$ and $R_3$ have the same significance as above;

(c) Or a cycloammonium quaternary salt corresponding to the formula:

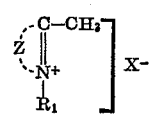

wherein:

Z, $R_1$, $X^-$ have the same significance as above, with a rhodanine compound of the formula:

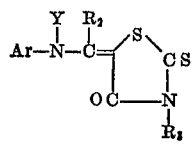

wherein:

Y is hydrogen or acyl,

Ar is aryl, and $R_2$ and $R_3$ have the same significance as above.

The condensations are advantageously carried out in the presence of a basic condensing agent, e.g. a tertiary amine such as trimethylamine, triethylamine, dimethylaniline, or a N-alkylpiperidine. A reaction medium is advantageously employed, e.g. pyridine, a lower molecular weight alcohol such as ethanol, dimethylsulfoxide, acetonitrile, etc.

The following preparations illustrate how the dyes of use according to the present invention can be prepared:

PREPARATION 1: DYE 1

(a) Anhydrous-1-(3-sulphatopropyl) - 2 - (2-anilinovinyl)pyrrolinium hydroxide.—10 g. (0.045 mole) of anhydro-1-(3-sulphatopropyl)-2-methylpyrrolinium hydroxide and 9.9 g. (0.0495 mole) of diphenylformamidine were melted on an oil bath at 150° C. in 5 min. After cooling, the product was caused to crystallize by addition of 50 ml. of methanol. The product was collected and washed with methanol and ether. Yield: 12.4 g. (85%). Melting point: 265° C.

(b) Dye 1.—1.1 ml. (0.01 mole) of acetic anhydride was added to a mixture of 3.24 g. (0.01 mole) of the above pyrrolinium compound and 1.91 g. (0.01 mole) of 3-carboxymethylrhodanine in 40 ml. of acetonitrile. The mixture was heated to the reflux temperature whereupon 5.6 ml. (0.04 mole) of triethylamine was added dropwise. Refluxing was continued for 15 minutes and then the reaction mixture was filtered while hot and diluted, after having been cooled, with ether. The precipitate was dissolved in the minimum of hot water, treated with a saturated aqueous solution of sodium chloride and left standing overnight. The sodium salt of the dye obtained was recrystallized from ethanol-water (4:1).

Yield: 1.75 g. (39%).

Melting point: above 260° C.

PREPARATION 2: DYE 4

A mixture of 6.48 g. (0.02 mole) of anhydro-1-(3-sulphatopropyl)-2-(222-anilinovinyl)pyrrolium hydroxide, 50 ml. of pyridine, 5.6 ml. (0.04 mole) of triethylamine, 4.82 g. (0.02 mole) of 3-sulphoethylrhodanine, and 2.2 ml. (0.02 mole) of acetic anhydride was stirred for 1 hour at ambient temperature whereupon 5 ml. of water were added and stirring was continued for 3 hours. The dye which crystallized upon cooling for several hours at 0° C., was collected by filtration and redissolved in 50 ml. of hot water. The solution was diluted with a saturated aqueous solution of sodium chloride. The dye salt that crystallized was filtered by suction after several hours and recrystallized from methanol-water.

Yield: 1.6 g. (15%).
Melting point: 260° C. with decomposition.

PREPARATION 3: DYE 9

To a mixture of 3.42 g. (0.01 mole) of anhydro-2-(2-anilinovinyl)-3-(3 - sulphatopropyl)thiazolium hydroxide and 2.49 g. (0.01 mole) of 3-(1,2-dicarboxyethyl)-rhodanine in 35 ml. of ethanol kept at 0° C., 3 ml. (0.027 mole) of acetic anhydride were added dropwise with stirring. After the addition of 2.8 ml. (0.02 mole) of triethylamine and 5 ml. of water stirring was continued for 2 hours. 1.5 g. of sodium hydroxide in methanol was added whereupon the dye formed was filtered by suction and redissolved in 2-hydroxypropionitrile. The solution was filtered to remove some insoluble material and the dye was caused to crystallize by addition of acetone and ether. It was recrystallized from water-isopropanol (1:4).

Yield: 2.3 g. (41%).
Melting point: above 260° C.

In accordance with the present invention photographic materials are provided comprising light-sensitive silver halide emulsion layers containing a merocyanine dye corresponding to the above general formula.

The hydrophilic colloid used as the vehicle for the silver halide may be any of the common hydrophilic colloids employed in photographic light-sensitive emulsions, for example gelatin, agar-agar, albumine, zein, casein, collodion, alginic acid, water-soluble cellulose derivatives such as carboxymethylcellulose, polyvinyl alcohol, poly-N-vinyl pyrrolidone or other hydrophilic synthetic or natural resins or polymeric compounds, gelatin being however favoured. If desired, compatible mixtures of two or more colloids may be employed for dispersing the silver halide.

The merocyanine dyes according to the present invention have an excellent sensitizing action in the green region of the spectrum and this sensitizing activity is not influenced under conditions of increased temperature and relative humidity.

Since the dyes according to the present invention do not enhance the fog and leave practically no residual strain after processing they are particularly suitable for the sensitization of emulsions of the Lippmann-type, especially the high-resolution Lippmann-emulsions of use for microelectronic mask-making used in the production of microelectronic integrated circuits, for the sensitization of emulsions of the "lith" type of use in photomechanical reproduction techniques, and for the sensitization of emulsions of use in stabilization processing according to which the photographic record is produced in the least possible time.

Photographic materials of use for microelectronic mask making comprise silver halide emulsion layers of the Lippmann-type having a layer thickness compried between 3 and 8 microns. These silver halide emulsions of the Lippmann-type have an average grain-size of less than 0.1 micron; they are preferably gelatino silver bromide emulsions which may comprise at most 8 mole percent of silver iodide and have a ratio of silver halide to gelatin comprised between 1:15 and 5:1. They should allow a correct reproduction of the dimensions of the integrated circuit images and therefore should be substantially free from staining.

Photographic materials of use for photomechanical reproduction techniques comprising silver halide emulsion layers of the "lith" type, i.e. fine-grained emulsions of high contrast containing at least 50 mole percent of silver chloride, should also be substantially free of staining so that very sharp screen dots and screen lines can be obtained. Emulsions of the "lith" type are usually developed in developers containing only hydroquinone as developing agent and having a low sulphite content which is achieved by the presence of formaldehyde forming formaldehyde-bisulphite compounds keeping the sulphite concentration at a low and constant value.

In stabilisation processing the residual non-exposed and nondeveloped silver halide is converted into light-inert complexes with the aid of a stabilizing solution comprising stabilizing agents. In these processes development is usually effected by means of a simple alkaline solution the developing agents being incorporated into the photographic emulsion layers. Since stabilisation processing occurs very rapidly—the whole processing generally lasting less than 1 minute—the sensitising dyes used should be such that they are removed or decolourised in this short processing time so that no stain is left in the material. In stabilisation processing the silver halide emulsion layer(s) is (are) preferably pure silver chloride emulsions or silver chlorobromide or silver chlorobromoiodide emulsions having at least 90 mole pecent of silver chloride and an average silver halide grain-size which is comprised between 0.1 to 0.3 micron. An emulsion layer of this type is characterised in that the latent image produced on imagewise exposure is fully developed within 10 seconds upon contact of the solution effecting development with the image-wise exposed silver halide grains.

Most of the known sensitizing dyes, even those comprising solubilizing groups, though they are satisfactory for use in ordinary photographic materials that are processed in the classical way, were found to be unsuitable for the above applications because they produce stains and undesirable colourations.

The methods of incorporating the dyes in the emulsion are simple and well known to those skilled in the art of emulsion making. The acid dyes or their salts are generally added to the emulsion in the form of a solution in a suitable solvent, e.g. an alcohol such as methanol, or a mixture of an alcohol and water. The solvent must of course be compatible with the emulsion and substantially free from any deleterious effect on the light-sensitive material.

The sensitizing dyes of use according to the invention can be incorporated at any stage of emulsion preparation and should be uniformly distributed throughout the emulsion. They are preferably incorporated after the chemical ripening and just before coating.

Various silver salts may be used as the light-sensitive salt such as silver chloride, silver bromide, silver iodide or mixed silver halides such as silver chlorobromide, silver bromoiodide and silver chlorobromoiodide.

The concentration in the emulsion of the sensitizing dyes corresponding to the above general formula can vary between wide limits, for example from 1 mg. to 1000 mg. per mole of silver halide. The most suitable and most economical concentration for any given emulsion will be apparent to those skilled in the art of emulsion making; it will vary according to the type of light-sensitive material and according to the effects desired.

The dyes are preferably incorporated into photographic emulsions the general sensitivity of which has been increased by chemical ripening. These emulsions may be chemically sensitized by effecting the ripening in the presence of small amounts of sulphur containing compounds such as allyl isothiocyanate, allyl thiourea, sodium thiosulphate, potassium selenocyanide, etc. The emulsions may also be sensitized by means of reducing sensitizers such as tin compounds, imino-aminoethane-sulphinic acids and the derivatives thereof, cadmium salts, and the salts of noble metals such as gold, platinum, palladium, iridium, ruthenium and rhodium.

The dyes according to the present invention are not influenced by other emulsion additives such as hardeners, stabilizers, antifoggants, colour couplers, wetting agents, development accelerators, plasticizers, etc. and are fully compatible with developing agents that might be present in the emulsion e.g. as is often done in material for stabilisation processing.

Suitable hardening agents are amongst others formaldehyde, chrome alum, halogen-substituted aldehydes comprising a carboxyl group such as mucobromic acid, diketones, dialdehydes, etc.

Compounds suitable for sensitizing the emulsions by development acceleration are e.g. compounds of the polyoxyalkylene type such as alkylene oxide condensation products as described amongst others in U. S. patent specifications 2,531,832 and 2,533,990, in United Kingdom patent specifications 920,637, 940,051, 945,340 and 991,608 and in Belgian patent specification 648,710 as well as onium derivatives of amino-N-oxides as described in United Kingdom patent specification 1,121,696.

Among the stabilizers customarily employed in emulsion may be mentioned mercury compounds such as the mercury compounds described in Belgian patent specifications 524,121, 677,337, and 707,386, U.S. patent specification 3,179,520, heterocyclic nitrogen containing thioxo compounds such as those described in German patent specifications 1,151,731, benzothiazoline-2-thione and 1-phenyl-2-tetrazoline-5-thione and compounds of the hydroxytriazolopyrimidine type such as 5-methyl-7-hydroxy-s-triazolo[1,5-a]pyrimidine.

The emulsions sensitized in accordance with the present invention may be coated on a wide variety of photographic emulsion supports. Typical supports include cellulose ester film, polyvinyl acetal film, polystyrene film, polyethylene terephthalate film and related films of resinous materials as well as paper and glass.

The following examples illustrate the present invention.

EXAMPLE 1

Identical portions of a lithographic silver halide emulsion, consisting of 76 mole percent of silver chloride, 23 mole percent of silver bromide and 1 mole percent of silver iodide, were spectrally sensitized by means of the dyestuffs listed in the table below.

The spectrally sensitized emulsion portions ready for coating contained 0.6 mole of silver halide per kg. and 0.1 millimole of spectral sensitizer per mole of silver halide. Each of the emulsion portions was coated on a subbed polyethylene terephthalate support prorata of 0.07 mole of silver halide per sq. m.

The materials thus obtained were exposed in a sensitometer once without filter (general sensitivity) and once through a filter (spectral sensitivity) the transmission of which for light of a wavelength shorter than 390 nm. is less than 0.1% and for light of a wavelength longer than 470 nm. is more than 90%.

The sensitometric results obtained as well as the percentage residual staining measured after processing at the $\lambda_{max}$ of the dyestuff concerned are listed in the table below.

| Dye used | Sens., max., nm. | Exposure without filter | | Exposure through filter | | Percent residual staining |
|---|---|---|---|---|---|---|
| | | Fog | Relative general speed (log It)[1] | Fog | Relative spectral speed (log It)[1] | |
| None | | 0.04 | 2.87 | 0.04 | | |
| Comparison dye with formula: 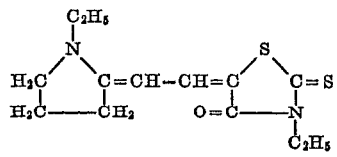 | 540 | 0.05 | 2.08 | 0.05 | 2.32 | 7 |
| Dye 2 | 530 | 0.06 | 2.25 | 0.05 | 2.49 | 0 |
| Comparison dye with formula: 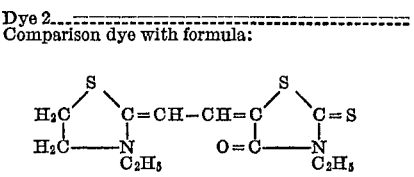 | 540 | 0.05 | 2.12 | 0.05 | 2.32 | 8 |
| Dye 9 | 530 | 0.05 | 2.30 | 0.05 | 2.53 | 0 |

[1] A decrease by 0.3 of the log It values, which are measured at desity 1 above fog, means a doubling of the speed.

The above results show that the spectral sensitizers of the invention leave no residual staining upon processing.

EXAMPLE 2

A silver bromide emulsion comprising 72 g. of silver bromide and 93 g. of gelatin was prepared by simultaneous addition of a silver nitrate solution and a potassium bromide solution to a 3% aqueous solution of gelatin. The conditions of precipitation were adjusted so that a Lippmann emulsion with an average grain size of $0.07\mu$ was obtained. Details as to preparation of Lippmann emulsion can be found amongst others in P. Glafkidès "Photographic Chemistry," vol. 1, 1958, Fountain Press, London. The emulsion was divided into several portions and to each portion one of the sensitizers listed in the table below were added in an amount of 0.1 millimole per mole of silver halide.

The emulsions were then coated on glass plates and dried so as to obtain an emulsion layer thickness of 5 microns.

The materials thus obtained were exposed in a sensitometer once without filter (general sensitivity) and once through a filter (spectral sensitivity) the transmission of which for light of a wavelength shorter than 460 nm. is less than 0.1% and for light of a wavelength longer than 550 nm. is more than 90%.

The sensitometric results obtained as well as the percentage residual staining measured after processing at the $\lambda_{max}$ of the dyestuff concerned are listed in the table below.

| Dye used | Sens., max., nm. | Exposure without filter | | Exposure through filter | | Percent residual staining |
|---|---|---|---|---|---|---|
| | | Fog | Relative general speed | Fog | Relative spectral speed | |
| None | | 0.04 | 4 | 0.04 | | |
| Comparison dye with formula: 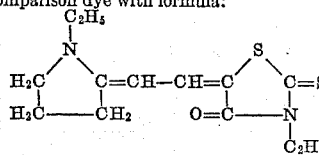 | 540 | 0.04 | 2.78 | 0.05 | 2.77 | 9 |
| Dye 5 | 525 | 0.04 | 3.40 | 0.04 | 3.40 | 1 |
| Comparison dye with formula: 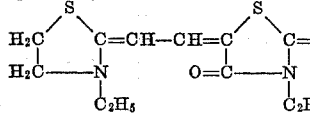 | 540 | 0.04 | 2.76 | 0.05 | 2.73 | 21 |
| Dye 8 | 540 | 0.04 | 3.35 | 0.04 | 3.38 | 3 |

EXAMPLE 3

A cellulose triacetate film support was provided at one side with a gelatin antihalation layer and at the other side with a gelatin-cellulose nitrate subbing layer, a gelatin intermediate layer having a dry weight of 4.0 g. per sq. m., a light-sensitive gelatin silver halide emulsion layer containing hydroquinone and 1-phenyl-3-pyrazolidinone and a gelatin antistress layer comprising 1.5 g. of gelatin per sq. m.

The silver halide emulsion used was a rapidly developable silver chlorobromoiodide (98 mole percent chloride, 1.8 mole percent bromide and 0.2 mole percent iodide) emulsion having an average grain size of about 1.8 micron and a ratio of gelatin to silver nitrate of 0.75 and comprising as spectral sensitizer one of the dyes listed in the table in an amount of 88 mg. per 100 g. of silver nitrate used.

It was applied in such a way that per sq. m. 2 g. of hydroquinone, 0.3 g. of 1-phenyl-3-pyrazolidinone and an amount of silver halide equivalent to 5.0 g. of silver nitrate were present.

The light-sensitive material was imagewise exposed in a sensitometer whereupon it was guided in a compact automatic processing unit at a constant speed in order through the following four processing solutions at room temperature.

(1) Activator liquid:
    G.
  Sodium hydroxide _____ 30
  Sodium sulphite _____ 50
  Potassium bromide _____ 2
  Water to make 1000 ml.

(2) Stabilizing liquid:
    G.
  Ammonium thiocyanate _____ 250
  Sodium metabisulphite _____ 20
  Water to make 1000 ml.
  Sulphuric acid to adjust the pH to 4.5.

(3) A fixer:
    G.
  Sodium thiosulphate _____ 200
  Potassium metabisulphite _____ 25
  Water to make 1000 ml.

(4) A rinsing liquid consisting of demineralised water.

The total processing time was 16 seconds (i.e., 4 seconds for each of the processing liquids).

The sensitometric results obtained as well as the percentage residual staining measured after processing at the $\lambda_{max}$ of the dyestuff concerned are listed in the table below. The values given for the speed are log It values measured at density 2 above fog. A decrease of the value by 0.3 means a doubling of the speed.

| Dyestuff used | Sens., max., nm. | Fog | Relative speed | Percentage residual staining |
|---|---|---|---|---|
| Comparison dye with formula: 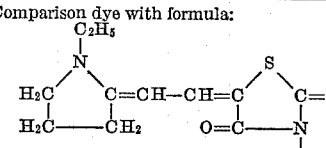 | 540 | 0.08 | 0.73 | 10 |
| Dye 5 | 525 | 0.08 | 0.94 | 3 |
| Comparison dye with formula: 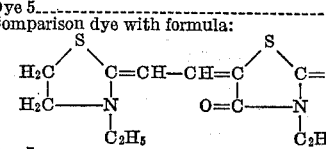 | 540 | 0.08 | 0.88 | 11 |
| Dye 7 | 535 | 0.08 | 1.00 | 3 |

We claim:
1. A light-sensitive silver halide emulsion containing a merocyanine dye corresponding to the general formula:

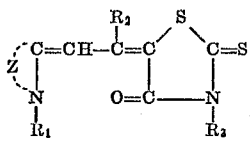

wherein:

Z stands for the atoms necessary to close a pyrroline nucleus, a tetrazole nucleus, or a thiazoline nucleus, $R_1$ stands for an aliphatic group or an aryl group which groups are substituted by sulphato, sulphamoyl or sulphonylcarbamoyl, $R_2$ stands for hydrogen, an aliphatic group or an aryl group, and $R_3$ stands for an aliphatic group or an aryl group which groups carry at least one sulpho or carboxyl group, the acidic groups being in the free acid or the salt form.

2. A light-sensitive silver halide emulsion according to claim 1, wherein $R_1$ is a $C_1$–$C_5$ alkyl group substituted by sulphato.

3. A light-sensitive emulsion according to claim 1, wherein said dye is present in an amount of 1 to 1000 mg. per mole of silver halide.

4. A light-sensitive emulsion according to claim 1, wherein said emulsion is an emulsion of the Lippmann-type having an average silver halide grain-size of less than 0.1 micron.

5. A light-sensitive emulsion according to claim 1, wherein said emulsion is an emulsion of the "lith" type comprising at least 50 mole percent of silver chloride.

6. A light-sensitive emulsion according to claim 1, wherein said emulsion is a rapidly developable emulsion for stabilisation processing comprising at least 90 mole percent of silver chloride.

References Cited

UNITED STATES PATENTS

| | | | |
|---|---|---|---|
| 3,705,038 | 12/1972 | Philippaerts et al. | 96—140 |
| 2,376,202 | 5/1945 | Staud | 96—140 |
| 2,519,001 | 8/1950 | Sprague | 96—140 |

FOREIGN PATENTS

| | | | |
|---|---|---|---|
| 904,332 | 8/1962 | Great Britain | 96—137 |

J. TRAVIS BROWN, Primary Examiner

U.S. Cl. X.R.

260—240.4